United States Patent [19]
Flury

[11] Patent Number: 5,816,474
[45] Date of Patent: Oct. 6, 1998

[54] LINEAR MOTOR PUMP FOR WAVE SOLDERING SYSTEMS

[75] Inventor: Karl Flury, Dietikon, Switzerland

[73] Assignee: Kirsten AG, Welschenrohr, Switzerland

[21] Appl. No.: 741,167

[22] Filed: Oct. 29, 1996

[30] Foreign Application Priority Data

Nov. 7, 1995 [CH] Switzerland .............................. 3149/95

[51] Int. Cl.⁶ ............................................... B23K 3/06
[52] U.S. Cl. ........................... 228/37; 228/260; 118/429; 219/214; 219/628; 219/634; 219/672; 392/465; 392/466; 392/471; 310/11
[58] Field of Search ...................... 228/37, 260; 118/429, 118/620; 219/214, 628, 634, 672; 392/465, 466, 471; 310/11

[56] References Cited

U.S. PATENT DOCUMENTS

| | | |
|---|---|---|
| 3,685,715 | 8/1972 | Perrin .......................................... 228/43 |
| 3,797,724 | 3/1974 | Flury et al. .................................. 228/37 |
| 3,941,088 | 3/1976 | Ronafoldi et al. ......................... 118/620 |
| 4,375,270 | 3/1983 | Minchev et al. ............................ 228/37 |
| 4,568,012 | 2/1986 | Kakuhata et al. ........................ 118/429 |

*Primary Examiner*—Samuel M. Heinrich
*Attorney, Agent, or Firm*—Watson Cole Grindle Watson P.L.L.C.

[57] ABSTRACT

The linear motor pump for a wave soldering apparatus comprises in accordance with the invention several pumping channels arranged substantially parallel to each other and separate from each other. It includes preferably a multiply segmented stator. Each stator segment has one pumping channel allocated to same. By means of this a homogeneous pumping performance i.e. homogeneous pumping pressure distribution over a practically arbitrary width is achieved, which leads to a homogeneous solder wave. By the arrangement of the pumping channels and the design of the stator in accordance with the invention a turbulent whirling of the solder is made practically impossible.

16 Claims, 5 Drawing Sheets

LINEAR MOTOR PUMP FOR WAVE SOLDERING SYSTEMS

Background of the Invention

1. Field of the Invention

The present invention relates to a electrodynamic linear motor pump for wave soldering systems, having a linear motor, a solder container, a wave nozzle, a pumping station including an inlet side and an outlet side, which inlet side is connected to the solder container and which outlet side is connected to the Wave nozzle, and having a stator located underneath. It relates further to a wave soldering system having such a linear motor pump and to a method of operating such a electrodynamic linear motor pump.

2. Description of the Prior Art

A wave soldering apparatus with a electrodynamic linear pump is known, for example, by the patent specification U.S. Pat. No. 3,797,724. The pump disclosed in mentioned document generates a magnetic field which is directed perpendicularly to the pumping direction, and a current which is directed perpendicularly to the magnetic field and to the pumping direction, which together exert a force action onto the solder flowing in the desired pumping direction. Apart from the medium being pumped, such a pump has itself no movable parts and is, therefore, practically maintenance-free. The electric current Is generated by means of a transformer and is fed via electrodes into the pumping zone of the wave soldering apparatus. In order to ensure that the current and the magnetic field run at an equal phase, the field winding must be tuned to the respective frequency of the supply voltage by a condenser connected in series and operating as resonance circuit. The solder container and the bottom part of the pump of the wave soldering apparatus disclosed in mentioned document which consist of enameled cast iron act as magnet poles and direct the magnetic field towards the pumping zone. The pumping effect depends, thereby, to a large extent from the magnetic properties of the cast iron parts. These properties depend among others from the silicon and carbon content and from the crystalline structure of the cast iron. It has been proven that an identical behavior of a larger number of pumps can not be obtained safely and reliably during production. This is specifically problematic in case of a simultaneous use of two or more pumps for wide wave soldering systems. In such arrangements each individual pumps must include a separate electrical control in order to obtain a homogeneous and uniform solder wave over the entire width and a electronic balancing of the individual controlling must be made. During maintenance work of the pumps, specifically for an exchanging of the electrodes, the solder must be completely discharged at the arrangement disclosed in mentioned document which renders the maintenance complicated and expensive.

An apparatus with a linear motor is disclosed in the patent specification DE 3 300 153 (U.S. Pat. No. 4,568,012). As the most important difference between this design and the design according to the above mentioned document, this pump includes no electrodes. Also, the only moving component is the pumped medium, that is the solder itself. The electric current needed for the pumping action is transmitted without any direct contact inductively into the liquid solder. Hereto a comb shaped iron core which is composed of layers of a plurality of thin iron sheets is used. The iron core is thereby arranged directly under the pumping channel of the soldering system. A plurality of equidistant arranged coil grooves are formed perpendicularly to the pumping direction along the pumping channel in the iron core, whereby their open upper ends are directed towards the pumping channel. The cooling of the coils is provided by a blower that blows air into the gaps between the windings of the coil and the iron core. This kind of cooling has proven to be disadvantageous because these gaps should have a as large as possible cross section for a sufficient cooling action, while an as small as possible gap space should remain for good electrical properties. Also, a non-uniform cooling occurs over the width of the pump because the flow of the cooling air runs transverse to the pumping direction. Therefore, the cooling air entry side is more strongly cooled than the exit side. For this reason the width of the pumping channel is extremely limited, i.e. the pumping channel is designed narrower than the soldering wave which is to be produced. The result thereof is that an increase of the cross section must occur at the passage from the pumping channel to the wave outlet. This causes, however, a considerable production of whirls or turbulences, resp. Furthermore, the circulating electric currents induced by this design of pumps generate practically only in the center of the channel a force component directed in the desired pumping direction At the side walls of the channel a force component is generated which is merely directed towards the wall, i.e. perpendicularly to the pumping direction. The result is the generation of turbulences in the solder, whereby only the remaining portions of the turbulences which are directed in the pumping direction remain to provide a pumping action. Due to this generation of turbulences a non-homogeneous pressure distribution over the width of the wave is produced, which according to the teachings of mentioned document must be corrected by means of a perforated mask having depending from the respective locations variously large diameters of the openings. Due to the oxide components that circulate in the solder the perforated mask is subject to an excessive wear and is prone to clogging after a short time of operation. The cleaning of this perforated mask is quite cumbersome, because the wave soldering apparatus must be opened at least at the area of the pumping channel. The solder must, thereby, be kept in a liquid state.

SUMMARY OF THE INVENTION

A general object of the present invention is to provide a pumping drive for a wave soldering apparatus of the kind mentioned above which can produce without the need for any maintenance a desired homogeneous solder wave of any width without turbulences.

A further object is to provide an electrodynamic linear motor pump having a pumping section which comprises at least two pumping channels arranged separate from each other.

Yet a further object is to provide a wave soldering apparatus with a electrodynamic linear motor pump which includes a solder container and a wave nozzle, in which the solder container consists of a magnetically conductive, insulated, e.g. enameled cast iron.

Still a further object is to provide a method of operating a electrodynamic linear motor pump in which the output of the pump is adjusted during the intermissions of the soldering in such a manner that the pump fills the wave nozzle but does not allow the solder to flow out of the wave nozzle.

The linear motor pump is a pump needing no maintenance and which incorporates a homogeneous pressure distribution over the entire width of the pump. Due to the design of the stator in accordance with the invention an air cooling can be realized with which the cooling air can be fed parallel to the pumping direction, and advantageously constant cooling properties can be provided across the width of the pump. Also, due to the design of the stator and of the pumping channels in accordance with the invention optimal magnetic fields are produced regarding the action of force onto the solder which render a generation of turbulences within the solder practically impossible.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
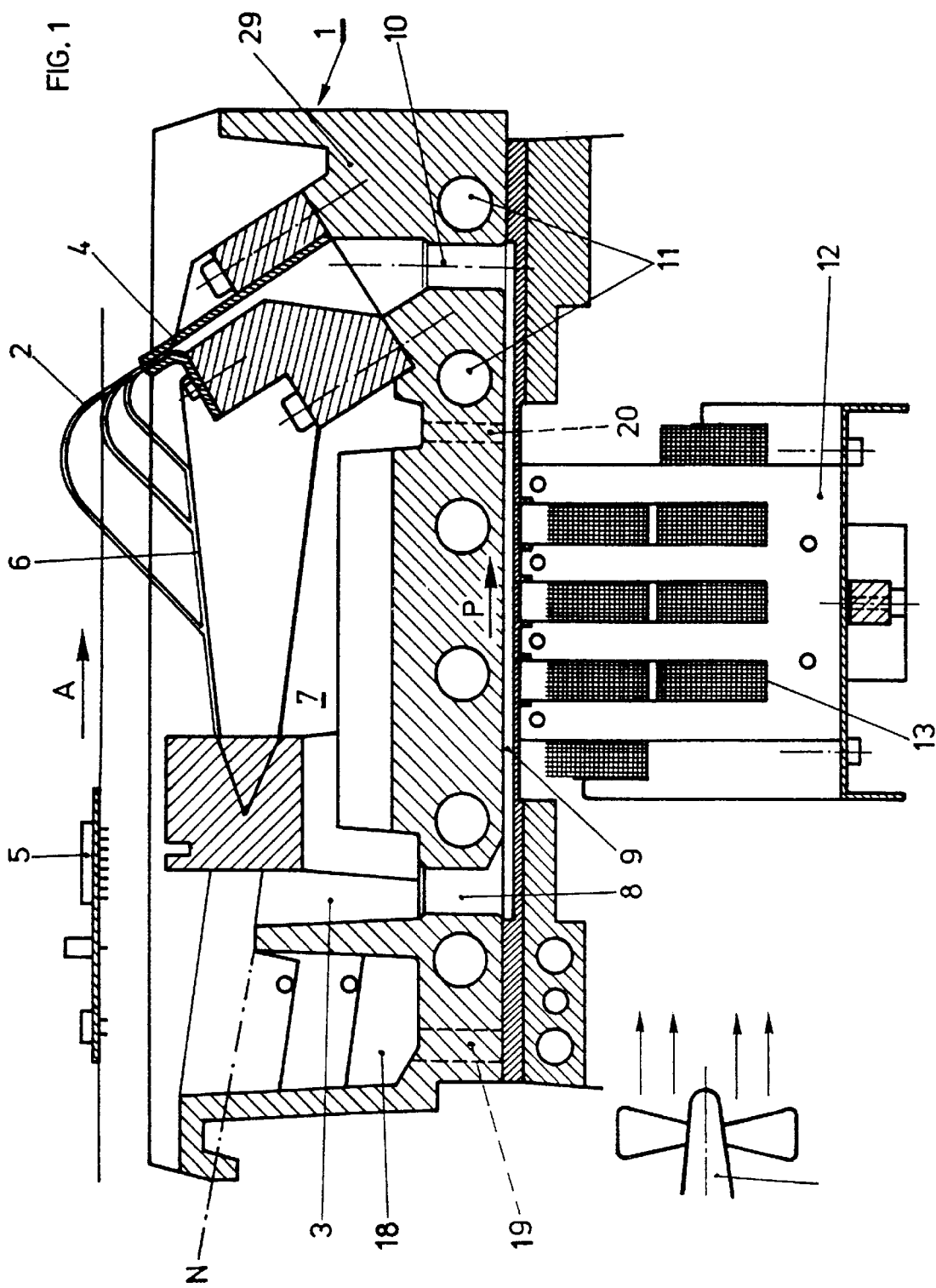
FIG. 1 is a longitudinal section through a wave soldering apparatus with a linear motor pump in accordance with the invention.

FIG. 1 illustrates the longitudinal section through a wave soldering apparatus 1 structured in accordance with the present invention. In such an apparatus a solder wave 2 of a liquid solder 3 is generated in that the solder 3 is forced through a wave nozzle 4. Printed circuit plates 5 which are to be soldered are then fed in the direction of the arrow A over the solder wave, whereby their lower sides are wetted by the solder 3. The excess solder 3 of the solder wave 2 is, thereby, collected by means of a collecting plate and lead into the solder container 7. From there the solder reaches via a feeding channel 8 the pumping channel 9 of the linear pump. The pumping channel 9 opens finally into a discharge channel 10 from which the solder is supplied to the wave nozzle.

In order to keep the solder 3 continuously above the melting temperature, heating elements 11 are for example placed in the wall of the solder container. In order to generate the magnetic field for the pumping action a stator is placed below the pumping channel. The stator includes a number of coil windings 13 which are arranged laterally of the pumping direction P. By an applying a voltage at the coils 13 a magnetic field is generated which induces current flows in the solder 3 which finally lead to a resultant force in the pumping direction P. This design corresponds essentially to the prior art such as known for example from the DE 3 300 153.

Figure 2:
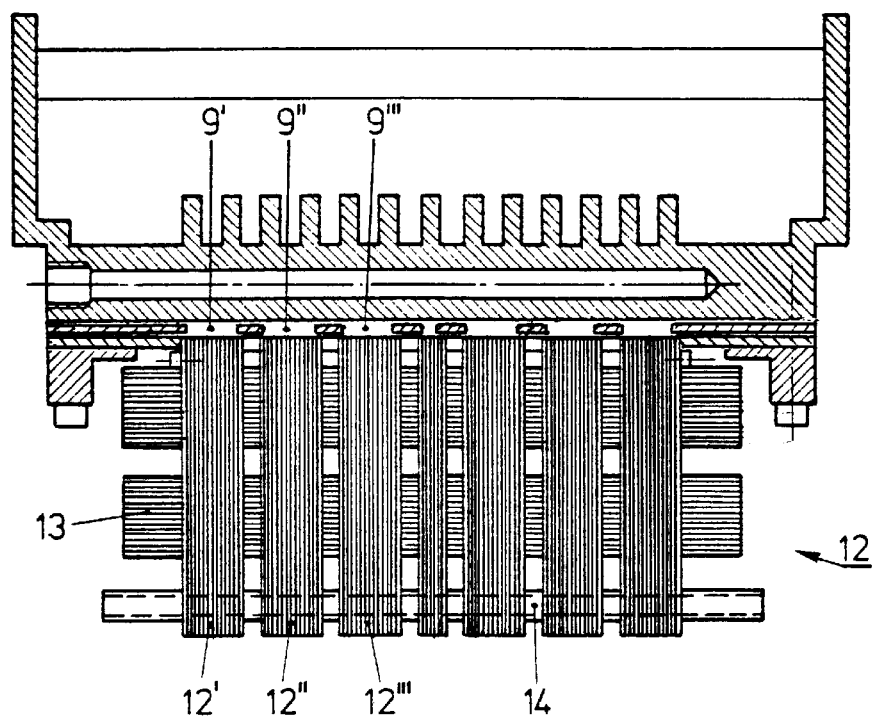
FIG. 2 is the cross section through a wave soldering apparatus with a view of the stator of the linear motor pump in accordance with the invention.
Figure 3:
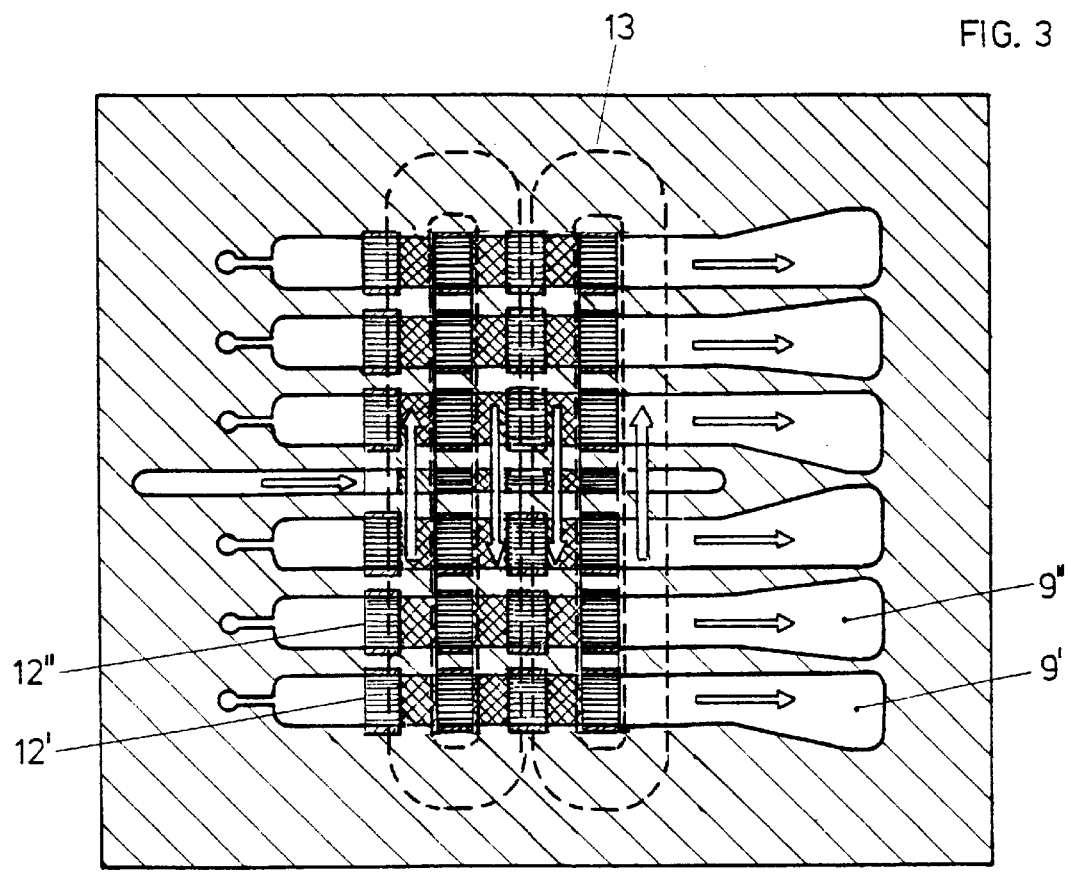
FIG. 3 is a top view of the stator of the linear motor pump in accordance with the invention including a view of the pump channels.

In accordance with the invention it is foreseen to form not merely one, but rather a plurality of pumping channels 9', 9" which are preferably arranged parallel to each other such as illustrated specifically in FIGS. 2 and 3. Here, a specifically preferred segmented stator 12 is illustrated.

The stator 12 illustrated in the FIGS. 2 and 3 is composed of a plurality of thin metal sheets and the segmenting is realized by means of distance rings 14 which separate the individual stator segments 12', 12", ... from each other. In accordance with the invention every segment 12', 12", ... is matched to one pumping channel 9', 9", ... , i.e. any respective stator segment 12''' has about the same width as the related pumping channel 9''' and is arranged below same. The coil windings 13 are lead through all segments 12', 12", ....

Figure 4:
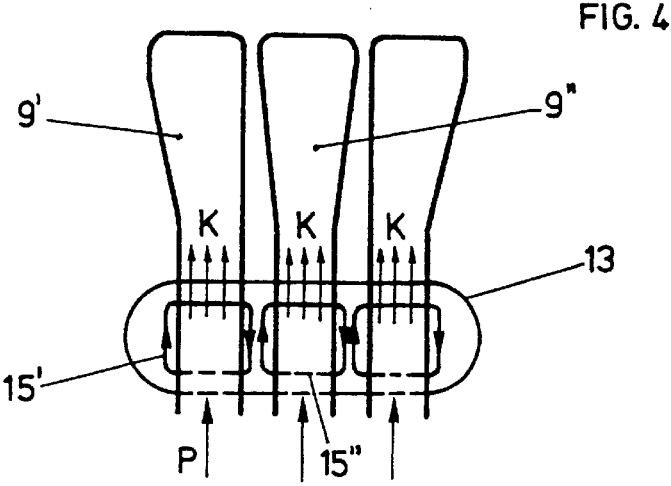
FIG. 4 is a schematic illustration of the magnet field produced and the force acting onto the solder in the pump channels according to the invention.

This arrangement in accordance with the invention leads to a practically homogeneous distribution of forces in the individual pumping channels such as illustrated schematically in FIG. 4. Due to the segmentation of the stator 12 the coils 13 generate for each pumping channel 9', 9", ... its own small circulating current 15', 15" circulating in the same direction. Portions of these circulating currents 15', 15" will be located in the electrically conductive partition between the individual pumping channels 9', 9", ... and cancel each other out. In the pumping channels 9', 9" themselves this leads to the generation of the practically homogeneous field of force indicated by means of the arrows K. Thus, a homogeneous pressure distribution and a over the entire width of the pump homogeneous solder wave 2 is produced for a practically unlimited number of adjacent pumping channels 9', 9", ....

A further advantageous effect of these pumping channels arrangement in accordance with the invention is that due to the segmentation of the stator 12 gaps arranged parallel to the pumping direction are formed between the individual stator segments 12', 12", ... which can be used as cooling channels. By means of this it is possible, contrary to the prior art known by the DE 3 300 153, to obtain a homogeneous cooling effect over the width. Therefore, the necessity of limiting the width of the active pumping channels 9 disappears. It can be designed with the same width as the solder wave 2 to be generated. Thus, turbulences due to a broadening of the discharge channel are avoided.

Figure 5:
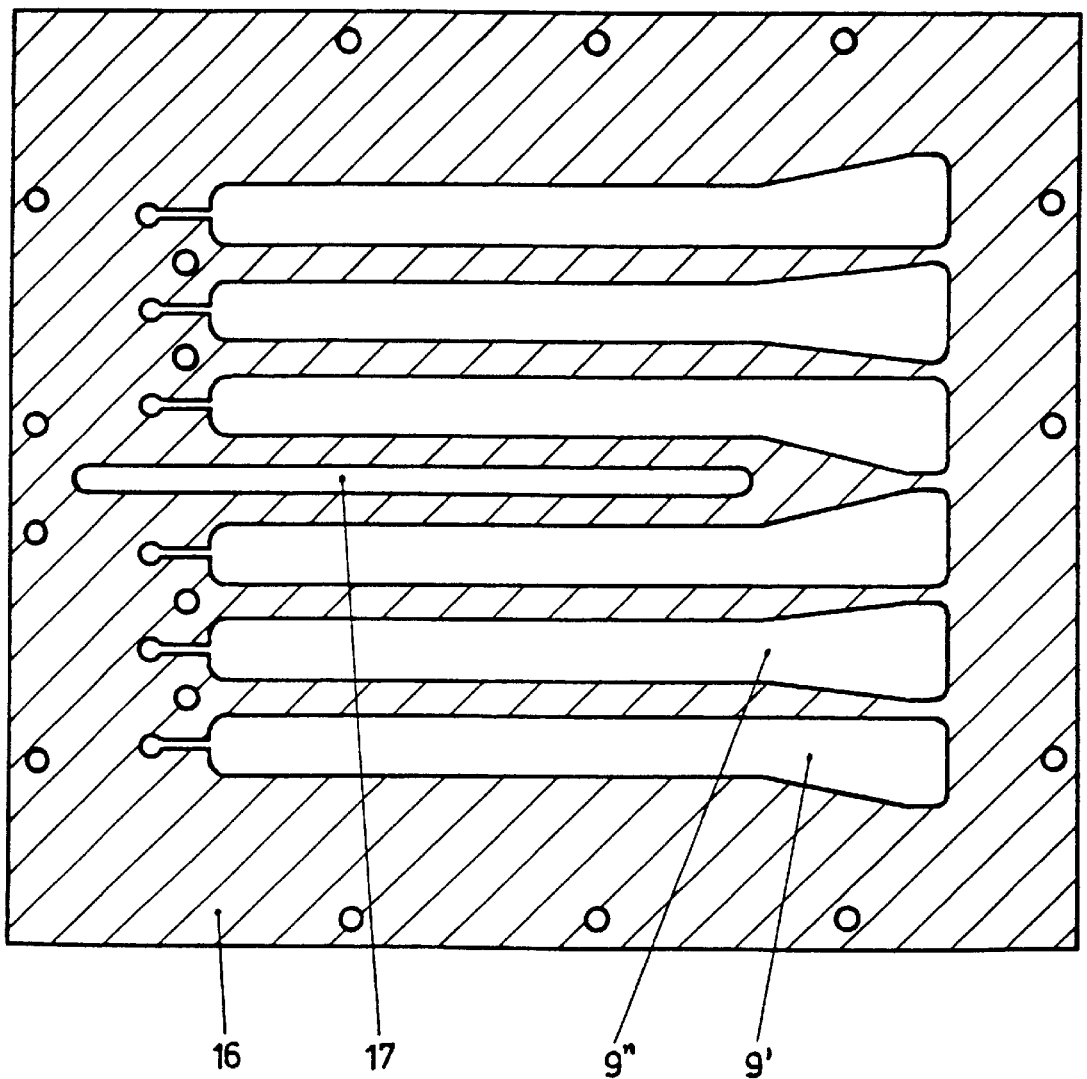
FIG. 5 is a view of a plate with pumping channels in accordance with the invention.

In FIG. 5 a top view of a plate 16 provided in accordance with the invention with the pumping channels 9', 9" is illustrated. This plate is mounted between the bottom side of the solder container 7, a non-magnetic sealing sheet and a planar supporting plate. The pumping channels 9', 9" are broadened at the outlet side (at the bottom of FIG. 5) and include at the inlet side a connection to a solder discharge device. The thickness of this plate 16 determines the height of the pumping channels 9', 9". It consists preferably of a material which is electrically conductive, easy to be tinned and resistant against a dissolving in liquid solder. Such a material is for instance iron.

Furthermore, an auxiliary channel 17 is formed at the center of this plate 16. Its inlet and outlet sides are arranged staggered relative to the pumping channels 9',9" and complete separated from these channels. This auxiliary channel 17 is used to pump solder out of the auxiliary container 18 through the inlet channel 19 and the outlet channel 20 back into the solder container 7 (FIG. 1). The auxiliary container 18 receives excess solder which reaches above the level line N of the wave soldering apparatus 1. The height position of the level line N is set by the overflow edge 21. Thus, the level of the solder in the container 7 will be independent from the amount of solder present in the apparatus. The height of the wave is not influenced by the consumption of solder.

Figure 6:
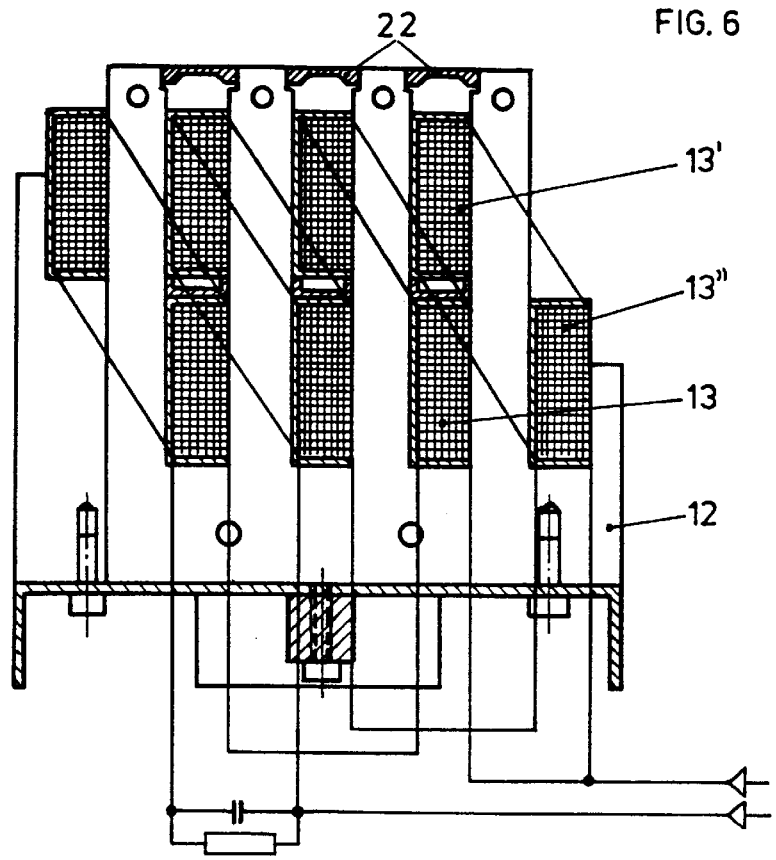
FIG. 6 is a longitudinal section through the stator according to FIG. 1.

Preferably, pole bridges 22 are arranged in the stator 12 above the cut-outs for the winding such as schematically shown in the longitudinal section of FIG. 6. By means of this the higher harmonics in the magnetic traveling field are weakened. This Figure discloses also the staggered looping of the windings 13. The upper part 13' of the winding is thereby located staggered relative to the lower part 13" of the winding by one winding cut-out. According to the illustrated example the preferred linear motor is a two-pole linear motor with four coils 13.

Figure 7:
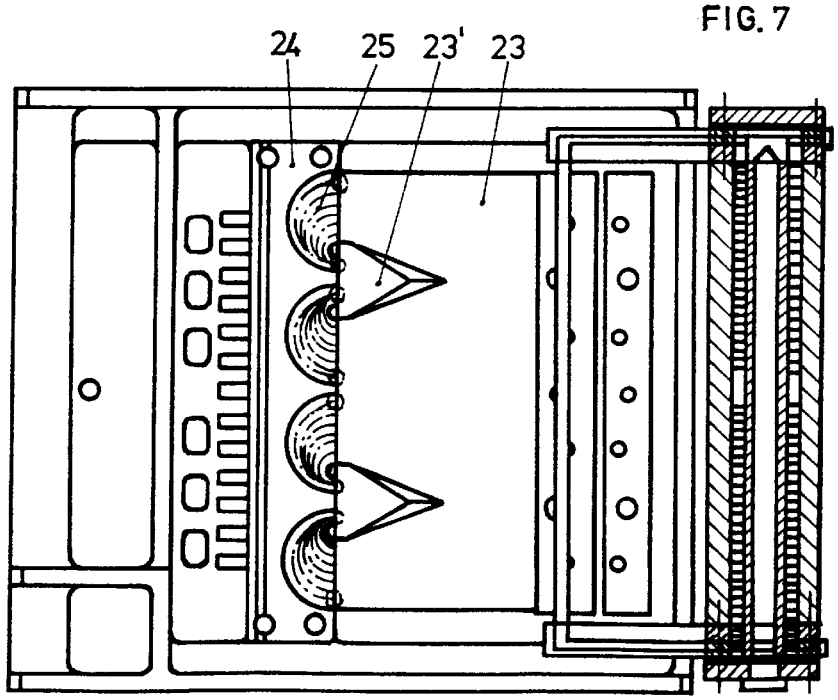
FIG. 7 is the top view of a wave soldering apparatus in accordance with the invention.
Figure 8:
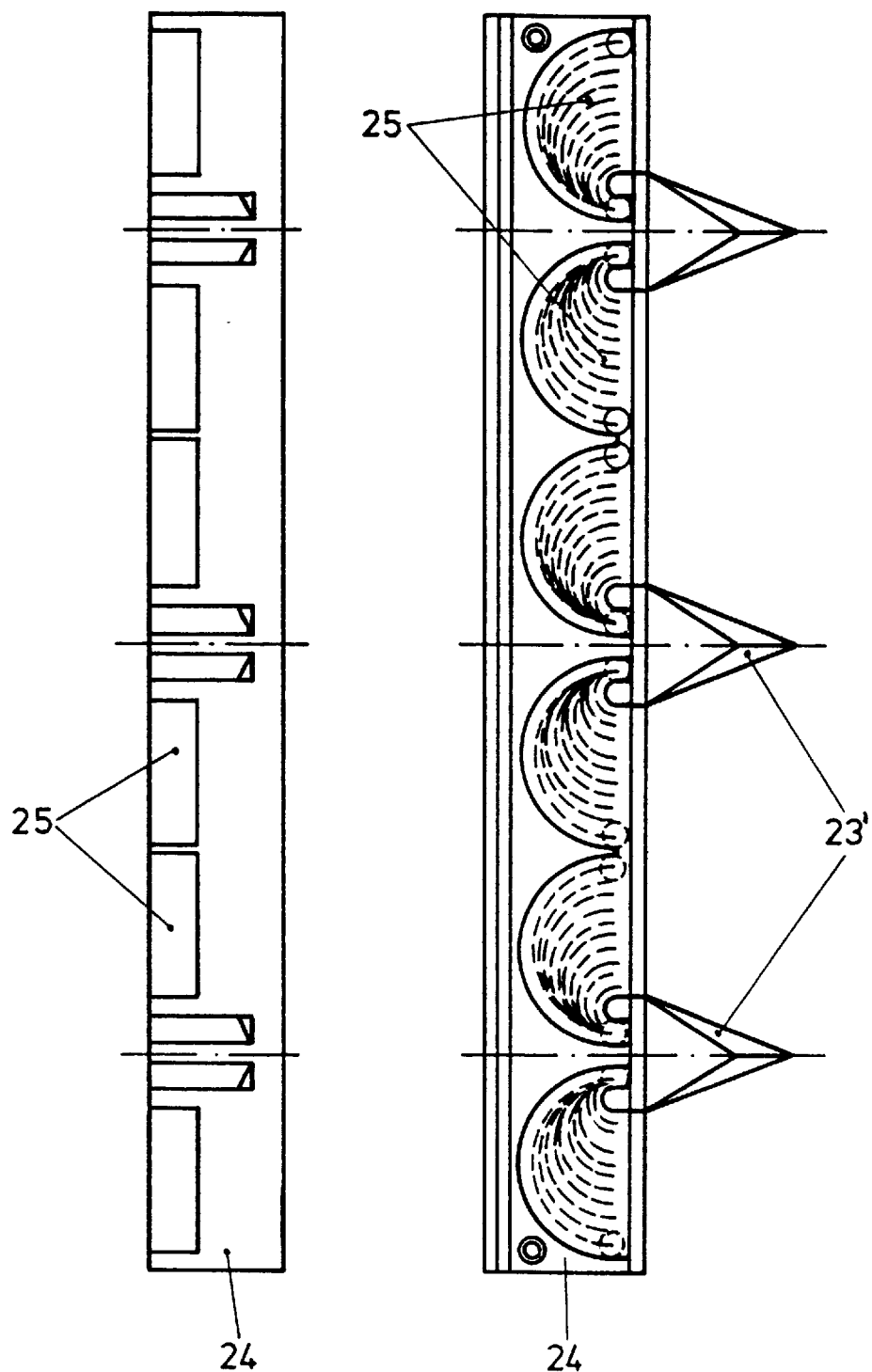
FIG. 8 is the top view and cross section through the discharge area of a wave soldering apparatus in accordance with the invention.

In order to prevent mixing of the solder 3 with oxides and impurities, a collecting plate 23 and a adjacent following discharge element 24 with especially designed return openings 25 are provided in accordance with the invention, such as can be seen in FIG. 7. The collecting plate 23 includes for instance wedge shaped projections 23' in order to guide the solder 3 flowing off to the return openings 25. The openings are designed in a hopper-like converging manner downwards and include at their edges spirally shaped steps such as specifically clearly illustrated in FIG. 8. By means of these steps a mixing of the solder with oxides and impurities is prevented, wherewith only clean, liquid solder is fed back into the pumping channels 9', 9". These particles remain on the surface of the solder and can be removed therefrom simply by means of for instance a skimming or by a soldering oil covering. By these means, the danger of clogging the pumping channels 9', 9" can be largely avoided.

The linear motor pump is preferably operated in such a manner that when the wave soldering apparatus 1 is in its stand-by state, the solder 3 fills the nozzle but no solder wave is produced. Thus, the inner side of the nozzle 4 is protected from contamination, soiling and oxidation. As additional protection against contamination and oxidation it suggested further in accordance with the invention to cover the solder in the container 7 and in the auxiliary container 18 with soldering oil.

The linear motor pumps designed in accordance with the invention and wave soldering apparatuses equipped with such pumps prove themselves to be practically maintenance-free and allow the production of a homogeneous solder wave of practically arbitrary width.

While there are shown and described presently preferred embodiments of the invention, it is to be distinctly understood that the invention is not limited thereto but may be otherwise variously embodied and practiced within the scope of the following claims.

I claim:

1. A electrodynamic linear motor pump for wave soldering systems, having a linear motor, a solder container, a wave nozzle, a pumping section including an inlet side and an outlet side, which inlet side is connected to the solder container and which outlet side is connected to the wave nozzle, and having a stator located underneath; said pumping section comprising at least two pumping channels arranged separate from each other.

2. The pump of claim 1, in which said stator is multiply subdivided or segmented, resp. in a direction perpendicularly to the direction of flow of solder in the pumping channels, whereby one pumping channel is related to each stator segment.

3. The pump of claim 2, comprising further a cooling blower adapted to feed air between the stator segments parallel to the direction of the flow of solder.

4. The pump of claim 1, in which the pumping channels are formed by a planar plate with adjacently arranged, substantially parallel cut-outs.

5. The pump of claim 4, in which said planar plate consists of a electrically conductive, easy to be tinned material which is resistant against a dissolving in liquid solder, preferably of iron.

6. The pump of claim 1, in which the linear motor is a capacitor-motor with at least two poles and includes at least two main and two auxiliary phase poles, resp.

7. The pump of claim 1, comprising a auxiliary phase winding and a phase shifting capacitor which are designed as a series resonance-circuit, and comprising a load resistor connected in parallel to the auxiliary phase winding and adapted to limit the auxiliary phase voltage to the value of the main phase voltage.

8. The pump of claim 7, in which the load impedance is mounted at the solder container in such a manner that it transmits its heat to the solder flowing out of the wave nozzle.

9. The pump of claim 1, in which the linear motor is designed as three-phase current motor having at least 7 poles.

10. The pump of the claim 1, in which the stator includes pole bridges to lessen higher harmonics in the magnetic traveling field generated by the linear motor.

11. The pump according to claim 1, in which at least one pumping channel has the inlet opening connected to a auxiliary container which is separate from the solder container and has the outlet channel opening into the solder container.

12. A wave soldering apparatus with a electrodynamic linear motor pump according to claim 1, which pump includes a solder container and a wave nozzle, in which the solder container consists of a magnetically conductive, insulated, e.g. enameled cast iron.

13. The wave soldering apparatus of claim 12, in which the solder container includes an overflow which opens into an auxiliary container arranged separate therefrom.

14. The wave soldering apparatus of claim 12, comprising a collecting element which includes a plate arranged obliquely relative to the horizontal direction and having an adjacent discharge area which comprises at least one hopper shaped opening having inner spiral shaped steps and which conducts the discharged solder back into the container.

15. A method of operating a electrodynamic linear motor pump according to claim 1, in which the output of the pump is adjusted during the intermissions of the soldering in such a manner that the pump fills the wave nozzle but does not allow the solder to flow out of the wave nozzle.

16. The method of claim 15, in which the output of the pump is increased at its standby state during selectable intervals for a short time in such a manner that a small solder wave for flushing the nozzle is generated.

\* \* \* \* \*